(No Model.)
W. F. DOWNEY.
CARRIAGE BRAKE.
No. 532,650. 2 Sheets—Sheet 1.
Patented Jan. 15, 1895.
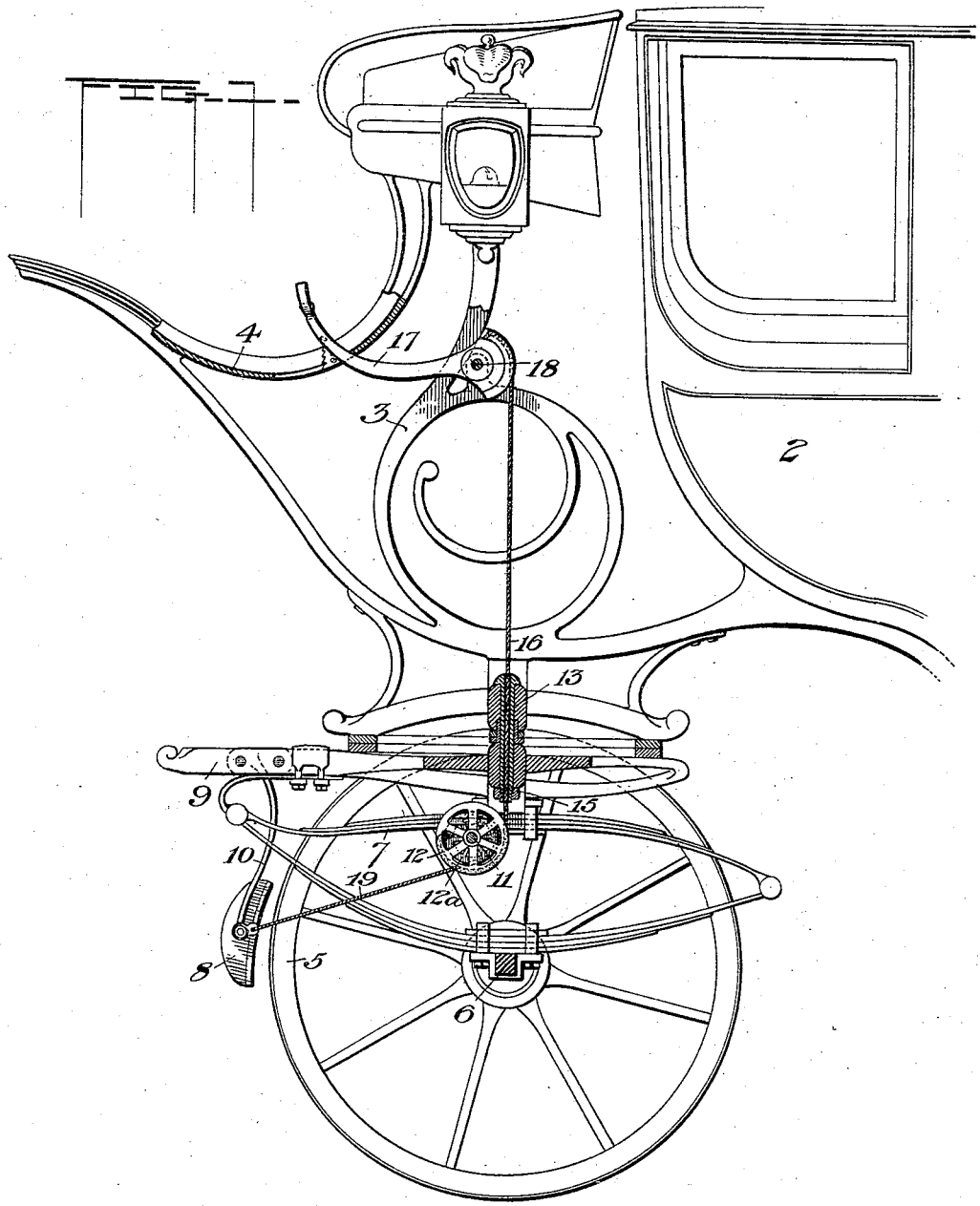
Witnesses
Inventor
Wm. F. Downey
by
W. Woodville Flemmy
Attorney

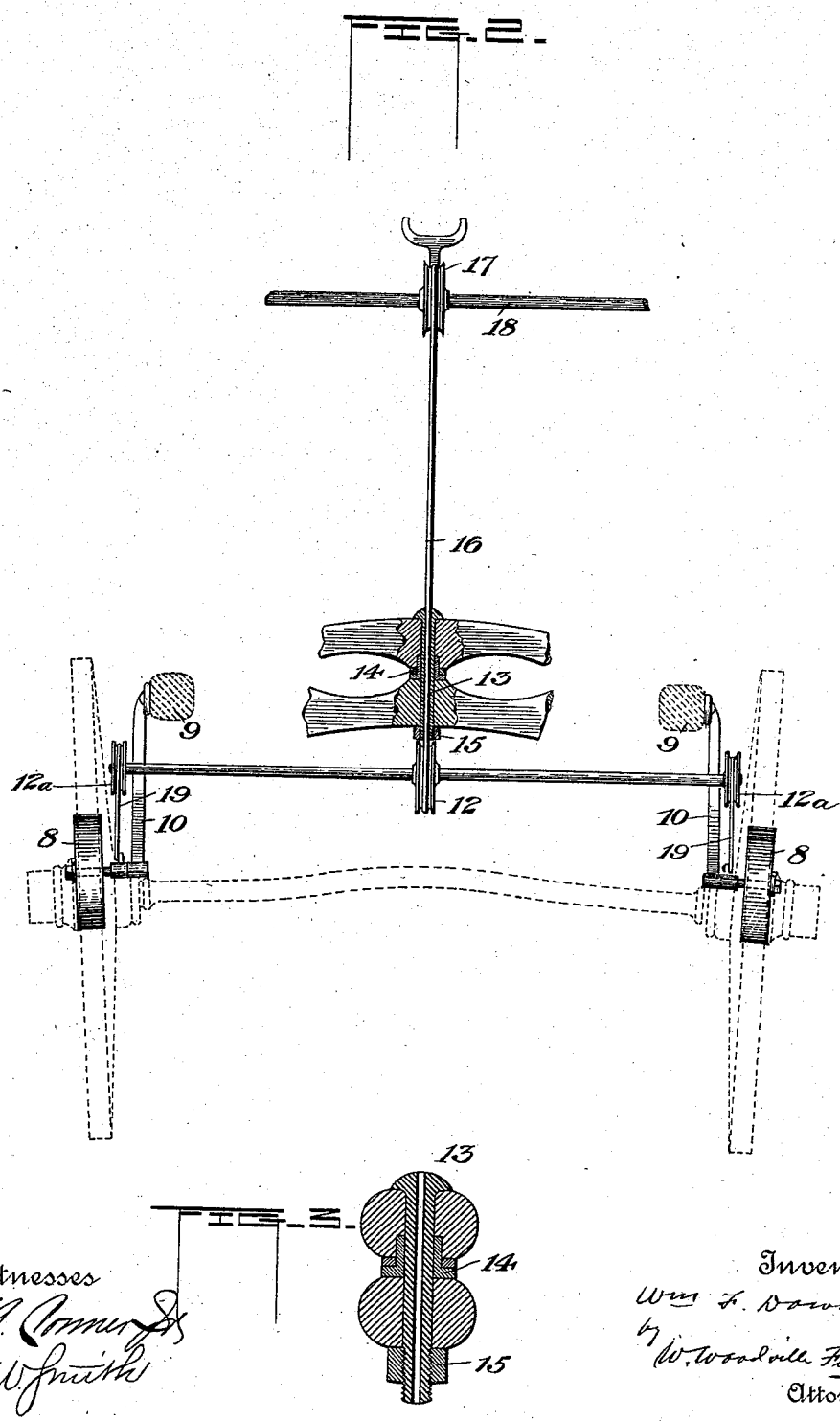

UNITED STATES PATENT OFFICE.

WILLIAM F. DOWNEY, OF WASHINGTON, DISTRICT OF COLUMBIA.

CARRIAGE-BRAKE.

SPECIFICATION forming part of Letters Patent No. 532,650, dated January 15, 1895.

Application filed December 30, 1893. Serial No. 495,196. (No model.)

*To all whom it may concern:*

Be it known that I, WILLIAM F. DOWNEY, a citizen of the United States, residing at Washington, in the District of Columbia, have invented certain new and useful Improvements in Brakes for Carriages and other Vehicles; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improvement in brakes for carriages and other vehicles.

The object of my invention is to provide a simple and effective brake which shall be easily operated and will be reliable under all circumstances and is particularly designed to be applied to the front wheels of vehicles which are swiveled upon the king bolt.

Heretofore it has been attempted to apply a brake to the front wheels but the complication of the mechanism which has been used and the fact that the wheels change their position with relation to the carriage or the vehicle body when turning one way and another, has rendered such mechanism defective and unreliable. It is the object of this invention to remedy these defects.

With these ends in view my invention consists of certain features of construction and combination of parts as will now fully hereinafter appear.

In the accompanying drawings—Figure 1, is a side elevation partly in section of the front of a carriage showing my invention applied to the front wheels. Fig. 2, is a cross section, looking from the rear outward toward the front showing the brake mechanism in full lines and the front wheels in dotted lines. Fig. 3 is a detail cross section showing my improved bolt.

In the accompanying drawings—2 represents the carriage body provided with the seat support 3 and the foot rest 4. The front wheels 5 are mounted on the axle 6 and to the axle is secured in the usual manner the elliptic spring 7. The upper side of said spring is clipped to the bolster in the ordinary way.

The brake mechanism consists of the brake shoes 8, which are connected to the stay bar 9, preferably by a flat spring metal bar 10 slightly bowed, and the spring action nominally tends to hold the brake shoe removed a slight distance from the wheels 5. The spring bars 10 are preferably formed with an eye at their lower ends through which a pin or bolt runs and secures the brake shoes 8 thereto.

Journaled in the elliptic springs 7 at a suitable point is a cross shaft 11, having a wheel or a segment 12 centrally located, and having its periphery tangent to the center of the king bolt 13. Upon either end of the cross shaft 11 is a smaller wheel 12$^a$, preferably so made in order to cause a quick action of the brake with a very slight movement of the wheel or segment 12, which will set the brake when power is applied. The king bolt 13 is constructed hollow, having a hole sufficiently large to allow the free passage of the operating rope, chain, or rod, as the case may be. The king bolt has the usual washers 14 and a securing nut 15. The operating rope or chain or rod 16 passes through the king bolt, and passes thence under the wheel or segment 12 or in vehicles already constructed may pass in close proximity to the king bolt and surround the same for about one-half of its circumference, though this distance may be more or less. The other end of said rope, chain or rod passes upwardly and is secured to an operating lever 17 which, as illustrated in the drawings is designed to be operated by the foot and is journaled in a cross shaft 18. A toothed rack is located adjacent to the operating lever and a dog of any suitable construction engages the teeth of said rack so as to hold the brake in the desired position. The ropes or chains 19 are attached to the wheels 12$^a$, in the same manner as that attached to wheel or segment 12, but the rope or chain 19 passes under and around said wheel in such a manner as to wind up said rope or chain when the operating lever is depressed and thereby apply the brake. The end of the rope or chain is attached to the brake shoe 8 in any suitable manner. It is obvious that if the brake be applied to the opposite side of the wheel the chains and cords must be adapted thereto.

The brakes may be operated by a hand lever, and the brake is equally applicable to the rear wheels. In the latter case the operating rope or chain would pass along the sides of the vehicles to the wheels or segments on cross shaft and thence to the brake shoes.

It is obvious that slight changes of construction may be made without departing from the spirit and scope of my invention.

Having thus fully described my invention, what I claim as new, and desire to secure by Letters Patent, is—

1. In a brake mechanism the combination with the front wheels of a vehicle, of a pair of brake shoes, a hollow king bolt, an operating chain or rope passing therethrough, a cross shaft directly beneath said king bolt, mounted in suitable bearings, wheels or segments at the outer ends of said shaft, having a chain or rope connected to said segments at one end and to the brake shoes at the other, an intermediate wheel or segment adjacent to the king bolt, the operating chain or rope having one end secured to said wheel or segment, and to an operating lever at the other end whereby the brake mechanism is operated, substantially as described.

2. In a brake mechanism the combination with the front wheels of a vehicle, of a pair of brake shoes, a hollow king bolt, an operating chain or rope passing therethrough, a cross shaft directly beneath said king bolt, mounted in suitable bearings, wheels or segments at the outer ends of said shaft, having a chain or rope partially surrounding said wheels or segments and secured thereto and to the brake shoes, an intermediate wheel or segment adjacent to the king bolt, the operating chain or rope partly surrounding said wheel or segment, one end secured thereto, and to an operating lever at the other end whereby the brake mechanism is operated substantially as described.

3. In a brake mechanism, the combination with the front wheels of a vehicle, of a pair of brake shoes, attached to the vehicle by spring arms, normally preventing engagement of the shoes with the wheels, a hollow king bolt, an operating chain or rope, a cross shaft mounted directly beneath said king bolt and parallel to the axle, said shaft being mounted in suitable bearings, wheels or segments on the outer ends thereof, having a chain or rope attached thereto at one end, and to the brake mechanism at the other, a segment or wheel centrally located on said shaft, in line with and directly beneath the king bolt, the operating chain or rope being attached thereto at one end, and partially surrounding the same segment or wheel, said chain or rope passing through the king bolt and an operating lever at the other end, whereby the brake mechanism is operated, substantially as described.

In testimony whereof I affix my signature in presence of two witnesses.

WILLIAM F. DOWNEY.

Witnesses:
FLOYD V. BROOKS,
WM. C. PRENTISS.